Sept. 18, 1962

R. VANDONI 3,054,292

REMOTE INDICATING SYSTEM FOR LIQUID
TANKS, ESPECIALLY FUEL TANKS

Filed Sept. 15, 1960

Inventor:
Remo Vandoni
By Michael S. Striker
Attorney

United States Patent Office 3,054,292
Patented Sept. 18, 1962

3,054,292
REMOTE INDICATING SYSTEM FOR LIQUID
TANKS, ESPECIALLY FUEL TANKS
Remo Vandoni, Villa Solatia, Locarno, Switzerland
Filed Sept. 15, 1960, Ser. No. 56,131
Claims priority, application Germany Sept. 15, 1959
6 Claims. (Cl. 73—299)

For remote indication liquid levels in containers which are connected with the indicator by pipelines it is desirable to be able to monitor all occurring phenomena e.g. the normal consumption, an existing liquid level, and also leakages or losses by overflow. For effecting such monitoring various systems actuating acoustic or optical signal devices are known. In most cases such systems are only suitable for monitoring one individual phenomenon as e.g. furnishing an indication of an existing liquid level or amount of liquid which, however, often is only a rough indication. For the registration of losses by overflow and the like special devices are necessary.

According to the present invention a remote indication system for the varying liquid level in tanks or the like containers is constructed to be a universal monitoring system. For this purpose according to the present invention an indicator chamber connected with the tank by a pipeline and containing an indicating liquid is mounted in a casing comprising a temperature responsive compensation means for the indicator chamber as well as further means for indicating leakages and losses by overflow, said means being designed in a manner known per se and are also connected with the tank by means of pipelines.

In a preferred embodiment of the present invention in the indicator chamber opposite to the graduated window thereof a movable wall is provided whose movement is controlled by temperature responsive bimetal bars, and further chamber containing the indicating liquid may be provided with an electric heating unit. The scale or graduation on the transparent window of the chamber is designed as an ascending zig-zag-line preferably provided with a logarithmic graduation.

For indicating losses—be it by leakage or by overflow—special connecting pipes are provided between the tank and the indicator housing and associated with pressure-responsive gauges arranged and controllable so as not to respond to a normal consumption of the liquid in the tank, e.g. of oil by an oil burner.

For monitoring the liquid level during a filling operation and for preventing losses by overflow, the respective communication pipe terminates in the tank at the predetermined permissible liquid level and, moreover, is provided with a float controlled valve which only operates when a certain liquid level is reached.

A diagram of the device and its functions is illustrated in the drawings, wherein.

Figure 1:
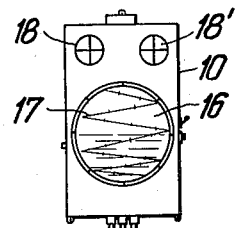
FIG. 1 is a schematic representation of the complete system.
Figure 2:
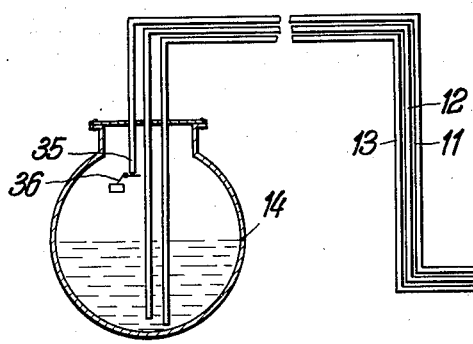
FIG. 2 is a partly sectional elevation of the indicating device with front wall and indicating chamber removed the section being taken along II—II of FIG. 3.
Figure 2:
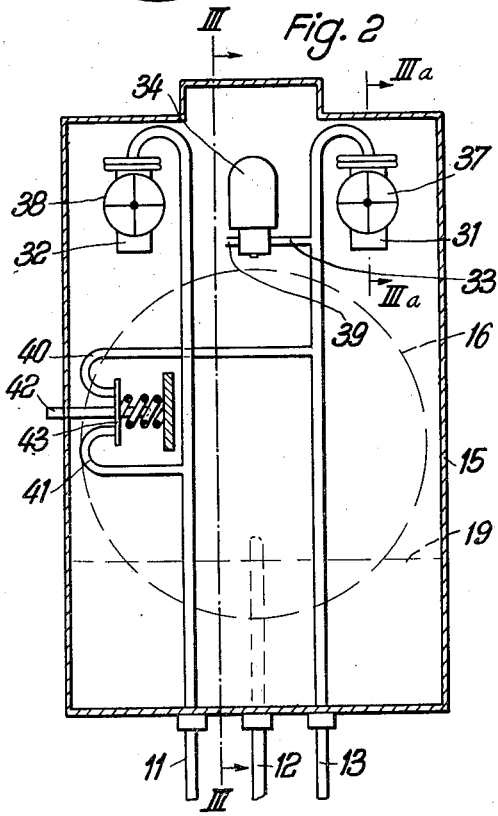
Figure 3:
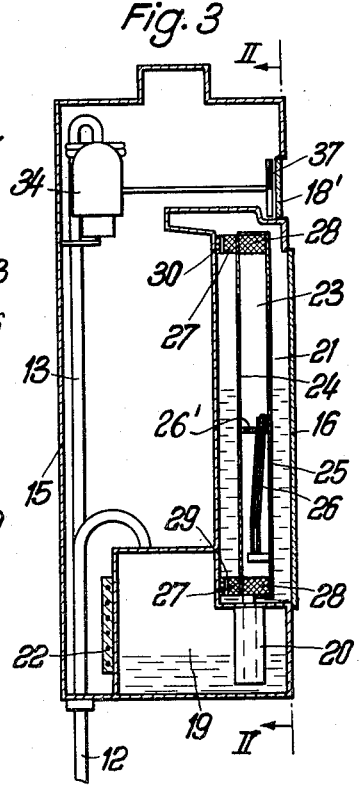
FIG. 3 is a vertical section along the line III—III of FIG. 2, except that elements 34, 37 are shown as appearing in the partial plane indicated by IIIa—IIIa.

An indicating device 10 according to the invention is connected by pipelines 11, 12, 13 with the tank 14 which contains a liquid supply. The pipelines 11 to 13 preferably are narrow copper tubes. The indicating device 10 consists of a casing 15 with a transparent and preferably circular window plate 16 provided with a scale 17. Additionally the casing is provided with two openings 18 and 18' for showing two signal disks 37, 38. In a preferred embodiment the scale 17 is a zig-zag-line rising from the bottom of the window 16 and having a logarithmic graduation applied thereto. This ensures that the indicating liquid level which is always horizontal intersects the scale line always at the same angle whereby accurate reading is facilitated.

The pipelines 11 to 13 from the tank 14 are connected with the casing 15 by means of threaded fittings or the like. The pipeline 12 which extends to a point near the bottom of the tank 14 leads at its other end to a chamber 19 containing the indicating liquid. Said chamber 19 is arranged in the lower part of the casing 15 and is connected with an indicator chamber 21 via a syphon pipe 20. In order to maintain a constant temperature in the liquid of chamber 19 there is provided a preferably thermostatically controlled heating element 22 on the wall of said chamber.

Within the indicator chamber 21 the front wall of which is formed mainly by the window plate 16 there is provided a compensation chamber 23 the one wall 24 of which is arranged to be displaceable by means of temperature responsive bars of bimetal fastened at one end to the stationary wall 25 in such a manner that upon temperature increase the volume of chamber 23 is decreased and that of chamber 21 correspondingly increased, and vice versa in the case of a temperature decrease. The free ends of the bimetal bars 26 are connected by link 26' to a point of the displaceable wall 24. In the illustrated position the bars 26 are in one extreme position in which the chamber 21 has maximum volume and chamber 23 has minimum volume. Upon drop of temperature the wall 24 is distorted and partly pushed toward the rear wall of chamber 21 whereby the volume of the latter is decreased. For sealing the compensation chamber 23 elastic rubber strips or the like 27, 28 holding wall 24 between themselves are provided. Openings 29, 30 in the seals 27 provide for uniform change of the level of the measuring liquid both in the front and in the rear portion of the indicator chamber 21.

For indicating leakages the pipeline 13 extending to a point near the bottom of the tank 14 is in communication with a signal means 31 in the casing 15 and further is connected by a branch pipe 33 with a solenoid valve 34. The pipeline 11, the mouth 35 of which is at the predetermined maximum or normal liquid level in the tank 14 and is provided with a float-actuated valve flap 36, is connected with a second signal means 32.

The signal means 31, 32 may be pressure gauges having diaphragms connected by gear transmission with the signals disks 37, 38 for turning the latter in accordance with the diaphragm action. Acoustic signal generators may be actuated with mercury switches preferably mounted on the signal disks 37, 38.

The solenoid valve 34 which opens and closes the opening 39 in the branch pipe 33 may be controlled so as to open e.g. when an oil burner causing normal consumption of oil stored in the tank 14 is in operation.

The pipelines 11, 13 may be momentarily opened to the atmosphere at the ends of pipe branches 40, 41 by operating a press button valve 42 the valve plate 43 of which normally closes the openings of the pipes 40, 41. Hereby the gauges in the signal means 31, 32 can be set to a reference pressure value so as to indicate thereafter pressure changes relative thereto.

The indication of an existing liquid quantity and the monitoring of the liquid level in the tank according to the present invention is based on the principle of communicating tubes resp. of balancing pressures in dependence on volume variations. Liquid levels may be read in liters on the graduated window plate 16. The compensation chamber 23 compensates the effects of temperature fluctuations since by means of a temperature-caused distortion or deflection of the rods of bimetal 26 the wall 24 is displaced whereby the required compensating change of volume of the indicator chamber 21 is produced. For maintaining a uniform temperature in the indicating liquid the heating unit 22 is connected with a thermostatic control. The indicating liquid may be e.g. coloured oil.

The signal means 31 is provided for indicating leakages due to a damage of the tank. The indicating means 32 is arranged to provide an overflow signal. In order to prevent changes of the volume of air contained in the container 14 from influencing the warning device 32 a float-actuated valve 36 is provided at the tank-side end of pipe 11 for holding the latter closed until the liquid level in the tank 14 exceeds the level of that pipe end.

According to the invention advantages are achieved because just one single device contains all the monitoring elements in clearly arranged form. The electric switches and signal devices may be connected with the local supply mains. If it is desired that the signal means 32 should indicate overflow to an outside operator controlling the refilling of the tank an electric signalling connection may be provided to cooperate with the indicating device 32 in such a manner that upon occurrence of overflow condition a signal is given to the operator.

By monitoring leakages the device 31 prevents an otherwise unnoticeable and unwanted infiltration of oil into the subsoil water. Therefore, the device according to the present invention replaces special controls, overflow containers and the like. The combination of all monitoring elements in the device according to the one invention results accordingly in a simpler monitoring system and better possibilities for control.

What I claim is:

1. A system for remote indication of changes of a liquid level in a tank, comprising, in combination, an indicator housing; main indicator means for showing normal changes of a liquid level in the tank, said main indicator means being arranged in said housing and including chamber means, a predetermined amount of indicating liquid in said chamber means, a window in a wall of said chamber means for permitting observation of the level of said indicating liquid in said chamber means which level is changeable by introduction of pressure into said chamber means; temperature compensating means in said housing; main duct means adapted to transmit from the tank hydrostatic pressure indicative of an existing liquid level in the tank to said chamber means so as to cause said level of said indicating liquid to correspond to said existing liquid level in the tank; at least one secondary indicator means for indicating abnormal changes of a liquid level in the tank, said secondary indicator means being arranged in said housing and including pressure-responsive gauge means capable of indicating a change of pressure relative to a reference value thereof, and signalling means for rendering such indication of a pressure change recognizable outside said housing; at least one secondary duct means adapted to transmit from the tank hydrostatic pressure changes indicative of a change of a selected liquid level in the tank to said secondary indicator means so as to cause indication of such pressure change; first control means cooperating with said secondary duct means for introducing into said gauge means said reference value of pressure; and second control means for blocking the operation of said secondary indicator means when only operation of said main indicator means is desired.

2. A system as claimed in claim 1, comprising first secondary indicator means for indicating a drop of said liquid level in the tank due to leakage distinct from normal consumption of liquid, and first secondary duct means cooperating with said first secondary indicator means, said second control means including valve means arranged in said first secondary duct means and operable to prevent transmission of pressure changes to said gauge means of said first secondary indicator means while ordinary consumption of liquid from the tank takes place, said system further comprising second secondary indicator means for indicating a rise of said liquid level in the tank above a predetermined maximum level, and second secondary duct means cooperating with said second secondary indicator means, said second control means including a float-controlled valve arranged at the tank-side end of said second secondary duct means substantially at said predetermined maximum level for opening said second secondary duct means to hydrostatic pressure only when the liquid level in the tank exceeds said maximum level, said first control means being adapted to introduce atmospheric pressure as said reference pressure value into said first and second secondary duct means.

3. A system as claimed in claim 1 wherein said temperature compensating means include heater means arranged within said housing and controllable to maintain a constant temperature of said indicating liquid.

4. A system as claimed in claim 1, wherein said temperature compensating means include adjusting means for changing the inner volume of said chamber means, and temperature-responsive actuator means for actuating said adjusting means in such a manner that said inner volume is changed in proportion to changes of the ambient temperature.

5. A system as claimed in claim 4, wherein said adjusting means include a closed secondary chamber within said chamber means, at least one wall of said secondary chamber being movable so as to change the volume thereof, said actuator means including bi-metal members arranged to move said wall depending upon deformation of said bi-metal members due to change of ambient temperature.

6. A system as claimed in claim 1, wherein said temperature compensating means include heater means arranged within said housing and controllable to maintain a constant temperature of said indicating liquid.

References Cited in the file of this patent

UNITED STATES PATENTS

| | | |
|---|---|---|
| 942,755 | Schollmeyer | Dec. 7, 1909 |
| 1,338,197 | Spencer et al. | Apr. 27, 1920 |
| 1,661,995 | Brown | Mar. 6, 1928 |
| 1,667,769 | Callan | May 1, 1928 |
| 2,559,436 | Insserstedt | July 3, 1951 |
| 2,696,114 | Cummings | Dec. 7, 1954 |

OTHER REFERENCES

| | | |
|---|---|---|
| 1,004,136 | France | Nov. 21, 1951 |
| 580,597 | Canada | Aug. 4, 1959 |